United States Patent [19]

Kellerwessel et al.

[11] 4,119,303

[45] Oct. 10, 1978

[54] METHOD AND DEVICE FOR PRECIPITATING COPPER CEMENT FROM A COPPER SOLUTION MIXED WITH IRON

[75] Inventors: Hans Kellerwessel, Aachen; Ernst Kausel, Cologne, both of Germany

[73] Assignee: Klöckner-Humboldt-Deutz Aktiengesellschaft, Germany

[21] Appl. No.: 636,545

[22] Filed: Dec. 1, 1975

[30] Foreign Application Priority Data

Dec. 6, 1974 [DE] Fed. Rep. of Germany ....... 2457660

[51] Int. Cl.² .............................................. C22B 3/00
[52] U.S. Cl. ...................................... 266/92; 266/170
[58] Field of Search .................... 75/109; 266/92, 101, 266/170

[56] References Cited

U.S. PATENT DOCUMENTS

| | | | |
|---|---|---|---|
| 3,281,395 | 10/1966 | Fukita et al. ............................ | 260/67 |
| 3,511,488 | 5/1970 | Stubblefield ........................... | 266/170 |
| 3,545,735 | 12/1970 | Wolf et al. .............................. | 266/92 |
| 3,674,466 | 7/1972 | Anderson et al. ...................... | 75/109 |
| 3,722,869 | 3/1973 | Moore ..................................... | 266/92 |
| 3,840,365 | 10/1974 | Hammes, Sr. et al. ............. | 75/109 X |
| 3,900,314 | 8/1975 | Hulsebos ............................ | 266/170 X |
| 3,958,947 | 5/1976 | Robinson et al. ............. | 75/101 R X |
| 4,003,557 | 1/1977 | Babinsky ......................... | 266/101 X |

OTHER PUBLICATIONS

German Published Patent Application 464,024 dated Jun. 30, 1942.

*Primary Examiner*—Roy Lake
*Assistant Examiner*—Paul A. Bell
*Attorney, Agent, or Firm*—Hill, Gross, Simpson, Van Santen, Steadman, Chiara & Simpson

[57] ABSTRACT

Improved method and apparatus for the precipitation of cement copper from a copper solution mixed with pieces of iron. The cement copper depositing on the iron pieces is loosened therefrom by means of constant movement of such pieces and then is separated and collected from the decopperized solution.

2 Claims, 1 Drawing Figure

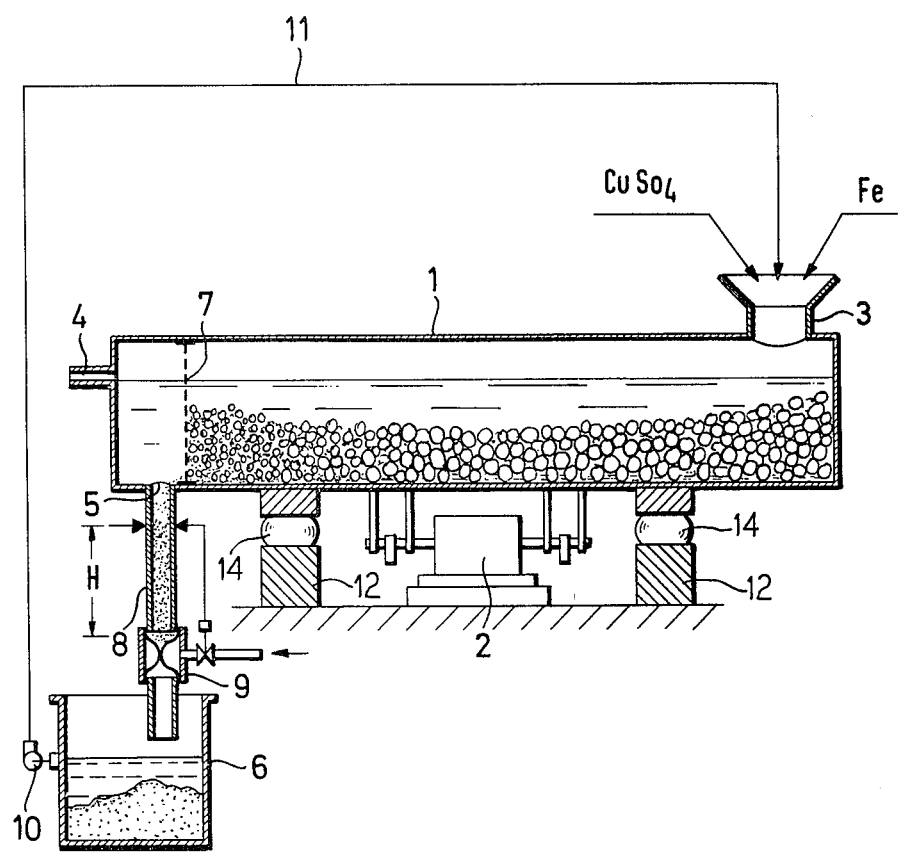

METHOD AND DEVICE FOR PRECIPITATING COPPER CEMENT FROM A COPPER SOLUTION MIXED WITH IRON

BACKGROUND OF THE INVENTION

The precipitation of copper from a copper solution (prepared, for example, by leaching a mine or copper oxide dump with a weak inorganic acid, such as sulfuric or hydrochloric acid) takes place in the presence of iron on account of the electromotive difference between copper and iron according to the known exemplary reaction equations:

$$CuSO_4 + Fe \rightarrow FeSO_4 + Cu;$$

$$CuCl_2 + Fe \rightarrow FeCl_2 + Cu; \text{ or}$$

$$2\, CuCl + Fe \rightarrow FeCl_2 + 2\, Cu.$$

The precipitated copper is termed "cement copper". The iron ordinarily is added to such solution in the form of sheet-iron scrap, cast iron bars, or iron sponge. In achieving precipitation, it is important that the surface of the iron be constantly kept clean; that is, the precipitated copper should be constantly separated from the iron, so that further copper may precipitate thereon. Towards this end, the iron pieces need to be kept constantly in motion.

In the case of the known precipitation techniques, this end has been sought by various means. Thus, in one apparatus, an agitator device is installed in the precipitation container. In another apparatus, the iron is automatically introduced, or rather introduced into, automatically moved baskets or rockers made of copper or wood. In another apparatus, the precipitation is accomplished in rotating, acid proof lined iron drums. When, in such last apparatus, a certain acceleration of the course of the reaction can be attained, then, for example, with a precipitation drum of approximately 30 m$^3$ of utilizable volume, it always takes about 1 hour or more until the copper is precipitated out to a desired copper residue content below about, 0.1 g/l in the decopperized solution, which is a convenient upper level in the cement copper production field for copper in decopperized solution, as those skilled in the art appreciate.

BRIEF SUMMARY OF THE INVENTION

More particularly, this invention relates to an improved technique for obtaining cement copper. In one aspect, this invention is directed to an improved method for the precipitation of cement copper from an aqueous copper solution mixed with pieces of iron, whereby the cement copper depositing on the pieces of iron is loosened by means of constant movement of the pieces of iron, and is removed from the decopperized solution. The pieces of iron are shaken with vibrations having a frequency and amplitude such that the pieces constantly strike against one another. The pieces of iron used are preferably initially charged in form of granulates.

In another aspect, this invention is directed to an improved apparatus for producing cement copper utilizing the method of this invention. This apparatus employs a vibrating tubular container supported by vibration means. This container has one or more charging openings in or adjacent one end thereof for the charging of preformed copper solution and of pieces of iron thereto, as well as a discharge opening for the removal of decopperized solution therefrom in or adjacent the opposed end thereof. In addition, this container is provided adjacent such opposed end thereof on a bottom side thereof with a closable discharge opening for the removal therethrough of cement copper. Shortly in front of (relative to the direction of material movement in this container) such discharge opening, a grate is arranged for holding back therefrom the pieces of iron. Preferably, this container is inclined with the discharge end thereof being slightly higher than the charging end. At such discharge opening, a static tube is attached which discharges into a cement copper collection receptacle. This tube is provided with a closure member at a spacing below the container. Preferably, opening and closing movements of such closure member are controllable automatically in dependence upon the filling height of the cement copper in such static tube.

It is a primary object of the invention to provide an improved technique for making cement copper more economically by accelerating the course of the reaction and also more rapidly.

Another object is to provide, for the practice of such a technique, an apparatus and method which additionally may be practiced continuously.

Other and further aims, objects, purposes, advantages, uses, and the like for the present invention will be apparent to those skilled in the art from the present specification.

BRIEF DESCRIPTION OF DRAWINGS

In the drawings:

The FIGURE illustrates one preferred embodiment of apparatus adapted for the practice of the present invention.

DETAILED DESCRIPTION

In accordance with the method of this invention, the pieces of iron are shaken with vibrations having such frequency and amplitude that the pieces of iron constantly strike against one another in the copper solution. By means of such an intensive shaking movement of the pieces of iron, the surfaces of the iron covered with precipitated cement copper are immediately knocked and rubbed substantially clean of copper deposited thereon, so that these surfaces are thereby again available for further reaction and deposition of more copper thereon. By means of such intensive mixing, simultaneously, the copper ion concentration in the treating solution in the area of the iron surfaces is apparently less than it is in the conventional prior art copper precipitating methods. The present method accelerates the rate at which cement copper is precipitated from a solution compared to the prior art.

The present method can be practiced in an advantageous manner with a tubular vibrating-container which is preferably cross-sectionally circular and longitudinally elongated and which has a bottom wall portion whose interior surface regions are longitudinally (relative to the container) linear (i.e., straight). The container itself is mounted for the desired vibrating movements on a vibration means with its said bottom wall portion extending horizontally or inclined slightly as indicated above. Such container is provided at or adjacent one end thereof with one or more changing openings for the copper solution, and for the pieces of iron, and is further provided at or adjacent the other end thereof with both a discharge opening for decopperized solution, and a closable discharge opening for the cement copper cement located in such bottom wall portion. Shortly in front of such discharge opening for the cement copper, and mounted on the container walls is a grate adapted for holding back from such opening the pieces of iron. It may be suitable to mount the container slightly inclined and raised at the discharge end thereof so that the cement copper collected on the container bottom wall portions may more easily flow down to the dicharging opening.

In utilizing a container constructed and arranged as indicated, one obtains the advantage compared with the prior art of a substantially greater rate of copper precipitation; that is, the apparatus of this invention may be operated with a somewhat greater volumetric degree of precipitation than previously achieved with a precipitation drum. In the present invention, the combined volume of iron and liquid together may constitute about 70% of the volume of the container.

In order to be able to operate the container continuously, in the further development of the present invention, there is additionally provided a static tube attached to the discharge opening. This tube is connected for discharge into a cement copper collection receptacle. Such a static tube has a closure or valve member associated therewith spaced at a distance below the bottom of the container. Thus, cement copper particles settling to the bottom of the container, on account of the constant vibrations of the container, slowly shift towards to the discharge opening, and are there then collected in the static tube, gradually displacing the copper solution therein at this tube fills with cement copper. As soon as this tube is filled with copper to a predetermined height, the collected quantity of cement copper is released therefrom through an opening of the closure member. Thereafter, the closure member is closed again before any appreciable quantity of the copper solution located in the container can escape therefrom through the static tube.

Referring to the drawing, there is seen one example of an apparatus for carrying out the method of the present invention. This apparatus includes a tubular container 1 which is held and supported by a conventional vibration drive assembly 2. The weight of the container and its contents can be at least largely supported by columns 12 each of which has incorporated thereinto an elastomeric cushion 14. Adjacent one end of the container 1 there is provided a charging opening 3 through which both the starting copper solution as well as the pieces of iron required for copper precipitation are charged. At the opposite end of the container 1 is located a discharge opening 4 through which the decopperized solution may be constantly withdrawn during apparatus operation. In addition, there is located in the bottom wall portion of the container 1 a discharge opening 5, through which the cement copper precipitated out of solution and collected on the container bottom may flow down into a collection receptacle 6 located thereunder through a static tube 8, while the pieces of iron are held back from opening 5 by means of a grate 7 arranged shortly in front of the opening 5. In order to promote still further the afterflow of the cement copper cement collected on the container bottom by means of the vibration movement, it is preferably to arrange the bottom wall portion of the container 1, or even the entire vibration container 1, so as to be slightly elevated at such discharge end relative to such charging end.

Below the discharge opening 5 is attached the static tube 8 which has a closure member 9 therein located at a spaced distance below the bottom of the container 1. This closure member 9 may, for example, be constructed as a pneumatically actuated squeeze-valve, which through the pressure built up by a column of cement-copper in tube 8 can be periodically opened briefly for discharge of cement copper. Alternatively, and as shown in the FIGURE embodiment, such a pneumatic valve may automatically be opened or closed in dependence upon the filled height H of the cement copper in the static tube 8. Such a pneumatic valve may be operated in combination with a timeswitch, (not shown). Thus, by such a closure member 9, it is possible to remove the precipitated cement copper from container 1 without any substantial loss of copper solution. It is possible, instead of such a closure member 9, to use a throttle member (not shown), such as, for example, a nozzle, or a cyclone-brake, and to adjust therewith the cement copper passage speed through tube 8 so that the cement copper may constantly flow down through tube 8 into receptacle 6.

Upon discharge of the cement copper from the static tube 8, a certain minimal quantity of copper solution flows down tube 8 into the receptacle 6. Since this so collected solution is usually not yet sufficiently decopperized, the apparatus is provided with a conduit 11 and a pump 10 associated therewith to convey such so collected solution back again into the container 1 and to maintain a desired liquid volume in receptacle 6.

The iron required for the precipitation reaction may be added either as sheet metal segments, or stamping scrap bunches or patches, granulated metal, or the like. Granulated metals, however, tend not to have as large a specific surface area as does sheet iron scrap, but granulates have the advantage that, on account of their characteristic more or less rounded off shapes, they typically may be shaken better in an apparatus of this invention. In addition, a constant intermixture and rotation takes place within the container 1, so that, by means of utilization of iron granulates, the precipitation conditions are or may be appreciably improved.

Thus, in one preferred operational mode, the method of the present invention involves a series of operations or steps, as follows: Initially, a starting aqueous copper solution and pieces of iron are charged into an end region of a horizontally elongated tubular zone having a longitudinally substantially straight bottom portion defined therein. Such zone is continuously vibrated at a frequency and with an amplitude sufficient to cause said pieces of iron to strike against one another. Decopperized solution is removed from an opposite end region of such zone, and also cement copper is removed from a first location in said opposite end region in said bottom portion while holding back from said location said pieces of iron. Such operations are preferably simultaneously conducted continuously once the process has been started up.

Preferably, in such preferred operational mode, the removal of decopperized solution takes place at a second location in said opposite end region which corresponds to a predetermined desired liquid level in said zone. Also preferably, such charging is conducted at a rate such that such decopperized solution can be continuously withdrawn from said zone at said second location during a normal continuous process operation. Preferably, such zone is filled with a total quantity of said starting copper solution and said pieces of iron sufficient to maintain said zone filled to a level of about 70% of its total volume.

In such preferred operational mode, after such cement copper is so removed from such a first location, such cement copper is then charged into a vertically elongated holding zone which terminates in a closure member. The so charged cement copper is gravitationally discharged from said holding zone in response to a predetermined opening of said closure member. Preferably, such a gravitational discharge is periodically accomplished, and more preferably such a periodic gravitational discharge is automatically accomplished whenever the height of cement copper in such holding zone reaches a predetermined level.

For accomplishing such a preferred operational mode, the present invention provides as a preferred apparatus one wherein there is a horizontally elongated tubular container having a substantially longitudinally straight interior bottom portion defined therein. Such container is mounted upon and primarily supported by elastomeric mounting means. A vibration drive assembly means which can be conventional in construction is functionally associated with such container and is adapted to vibrate said container at a predetermined frequency and predetermined amplitude.

Such container has starting material input port means defined in one end region thereof, and also has liquid output port means defined in an opposed end region thereof at a location adapted to maintain liquid in said container at a predetermined level. Further, such container has particulate material output port means defined in said opposed end region in said bottom portion. A grate means is associated with said container interiorly for holding back pieces of material larger in size than said particulate material from said particulate material output port means.

A tube means is functionally connected at one end thereof to said particulate material output port means. A closure means is provided in said tube means for regulating passage of said particulate material therethrough.

In such a preferred apparatus such container has its bottom portion slightly elevated at such opposed end region relative to said one end region thereof. Preferably such closure means is spaced downwardly from the bottom portion of the valve assembly adapted for opening and closing such tube means.

Additionally and preferably preferred apparatus is provided with control means for intermittently opening and closing such a valve assembly. Thus, for example, a sensing means is provided for such tube means for determining the level of such particulate material in such tube means and for generating an instantaneous output signal representation of such determination. A regulator means is provided which is functionally associated with such valve assembly for moving such valve assembly between substantially open and substantially closed positions in response to an input signal fed thereto. A controller means functionally interconnects such sensing means with such regulator means for receiving and comparing such instantaneous output signal with a preset signal generated by such controller means. Such preset signal is representative of a predetermined fill level in said tube. Such controller is further adapted to generate a difference signal representative of any predetermined comparison between such preset signal and such instantaneous output signal and to feed such difference signal to such regulator means. Thus passage of particulate material through such tube is controlled by the fill level thereof in such tube during operation of such apparatus.

The described apparatus is not limited to the precipitation of cement copper, but may also be used through insertion of corresponding precipitant for the precipitations occurring with other metallurgical methods, as for example, in zinc-metallurgy, cyanideleaching, cyanidation of gold and silver, or the like.

The claim is:

1. Apparatus for making cement copper comprising in combination a container having an elongated chamber with a horizontally extending axis for processing a copper solution mixed with pieces of iron, inlet means leading into one end region of said chamber for charging the chamber with a copper solution and iron pieces, a static tube outlet means for the settling of cement copper depending from the bottom portion of the container at an opposite end region of said chamber and communicating with the bottom of the chamber, a valve at the lower end of said static tube outlet means controlling discharge of settled cement copper solution from the tube, a grate means for holding back said pieces of iron located within said chamber and extending transversely thereacross adjacent to but in advance of said outlet means, an overflow liquid outlet at said opposed end region of the chamber, a resilient support for the container accommodating vibration thereof, vibration drive means connected to said container to vibrate said container at a predetermined frequency and amplitude sufficient to cause continued striking together of the pieces of iron, sensing means for said static tube outlet means for determining the level of said particulate material in said tube means and for generating an instantaneous output signal representation of said determination, regulator means functionally associated with said valve for moving said valve between substantially open and substantially closed positions in response to an input signal fed thereto, and controller means functionally interconnecting said sensing means with said regulator means for receiving and comparing said instantaneous output signal with a preset signal generated by said controller means, said preset signal being representative of a predetermined fill level in said tube, said controller being further adapted to generate a difference signal representative of any predetermined comparison between said preset signal and said instantaneous output signal and to feed said difference signal to said regulator means whereby passage of particulate material through said tube is controlled by the fill level thereof in said tube during operation of said apparatus.

2. Apparatus for making cement copper comprising in combination a horizontally elongated tubular container having a substantially longitudinally straight interior bottom portion defined therein.

elastomeric mounting means for supporting said container, vibration drive assembly means functionally associated with said container and adopted to vibrate said container at a predetermined frequency and predetermined amplitude, starting material input port means defined in one end region of said container for charging a copper solution and pieces of iron thereinto, liquid output port means defined in an opposed end region of said container at a location adapted to maintain liquid in said container at a predetermined level, particulate material output port means defined in said opposed end region in said bottom portion, grate means associated with said container disposed transversely thereacross therein for holding back pieces of material larger in size than said particulate material from said particulate material output port means, tube means functionally connected at one end thereof to said particulate material output port means, closure means in said tube means for regulating passage of said particulate material therethrough, said closure means being spaced from said container and comprising a valve assembly adapted for opening and closing said tube means sensing means for said tube means for determining the level of said particulate material in said tube means and for generating an instantaneous output signal representation of said determination, regulator means functionally associated with said valve assembly for moving said valve assembly between substantially open and substantially closed positions in response to an input signal fed thereto, and controller means functionally interconnecting said sensing means with said regulator means for receiving and comparing said instantaneous output signal with a preset signal generated by said controller means said preset signal being representative of a predetermined fill level in said tube, said controller being further adapted to generate a difference signal representative of any predetermined comparison between said preset signal and said instantaneous output signal and to feed said difference signal to said regulator means whereby passage of particulate material through said tube is controlled by the fill level thereof in said tube during operation of said apparatus.

* * * * *